United States Patent
Emma et al.

(10) Patent No.: US 8,417,917 B2
(45) Date of Patent: Apr. 9, 2013

(54) PROCESSOR CORE STACKING FOR EFFICIENT COLLABORATION

(75) Inventors: Philip G. Emma, Danbury, CT (US); Eren Kursun, Ossining, NY (US); Moinuddin K. Qureshi, White Plains, NY (US); Vijayalakshmi Srinivasan, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 842 days.

(21) Appl. No.: 12/570,351

(22) Filed: Sep. 30, 2009

(65) Prior Publication Data

US 2011/0078412 A1    Mar. 31, 2011

(51) Int. Cl.
G06F 9/00      (2006.01)
(52) U.S. Cl.
USPC ............... 712/10; 712/11; 712/13; 712/15
(58) Field of Classification Search ............ None
See application file for complete search history.

(56) References Cited

U.S. PATENT DOCUMENTS

| | | |
|---|---|---|
| 6,753,239 B1 | 6/2004 | Conn |
| 6,756,305 B1 | 6/2004 | Conn |
| 6,864,156 B1 | 3/2005 | Conn |
| 6,917,219 B2 | 7/2005 | New |
| 6,972,243 B2 | 12/2005 | Patel |
| 7,064,391 B1 | 6/2006 | Conn |
| 7,068,072 B2 | 6/2006 | New et al. |

OTHER PUBLICATIONS

Park et al., "MIRA: A Multi-Layered On-Chip Interconnect Router Architecture", 2008, IEEE.*
Loh et al., "Processor Design in 3D Die-Stacking Technologies", 2007, IEEE.*
Black et al., "Die Stacking (3D) Microarchitecture", 2006, IEEE.*
Xie et al., "Design Space Exploration for 3D Architectures", 2006, ACM.*
Kgil et al., "PicoServer: Using 3D Stacking Technology to Enable a Compact Energy Efficient Chip Multiprocessor", 2006, IEEE.*
Black et al., "3D Processing Technology and its Impact on iA32 Microprocessors", 2004, IEEE.*

* cited by examiner

Primary Examiner — Eddie P Chan
Assistant Examiner — Benjamin Geib
(74) Attorney, Agent, or Firm — Francis Lammes; Stephen J. Walder, Jr.; William J. Stock

(57) ABSTRACT

A mechanism is provided for improving the performance and efficiency of multi-core processors. A system controller in a data processing system determines an operational function for each primary processor core in a set of primary processor cores in a primary processor core logic layer and for each secondary processor core in a set of secondary processor cores in a secondary processor core logic layer, thereby forming a set of determined operational functions. The system controller then generates an initial configuration, based on the set of determined operational functions, for initializing the set of primary processor cores and the set of secondary processor cores in the three-dimensional processor core architecture. The initial configuration indicates how at least one primary processor core of the set of primary processor cores collaborate with at least one secondary processor core of the set of secondary processor cores.

20 Claims, 5 Drawing Sheets

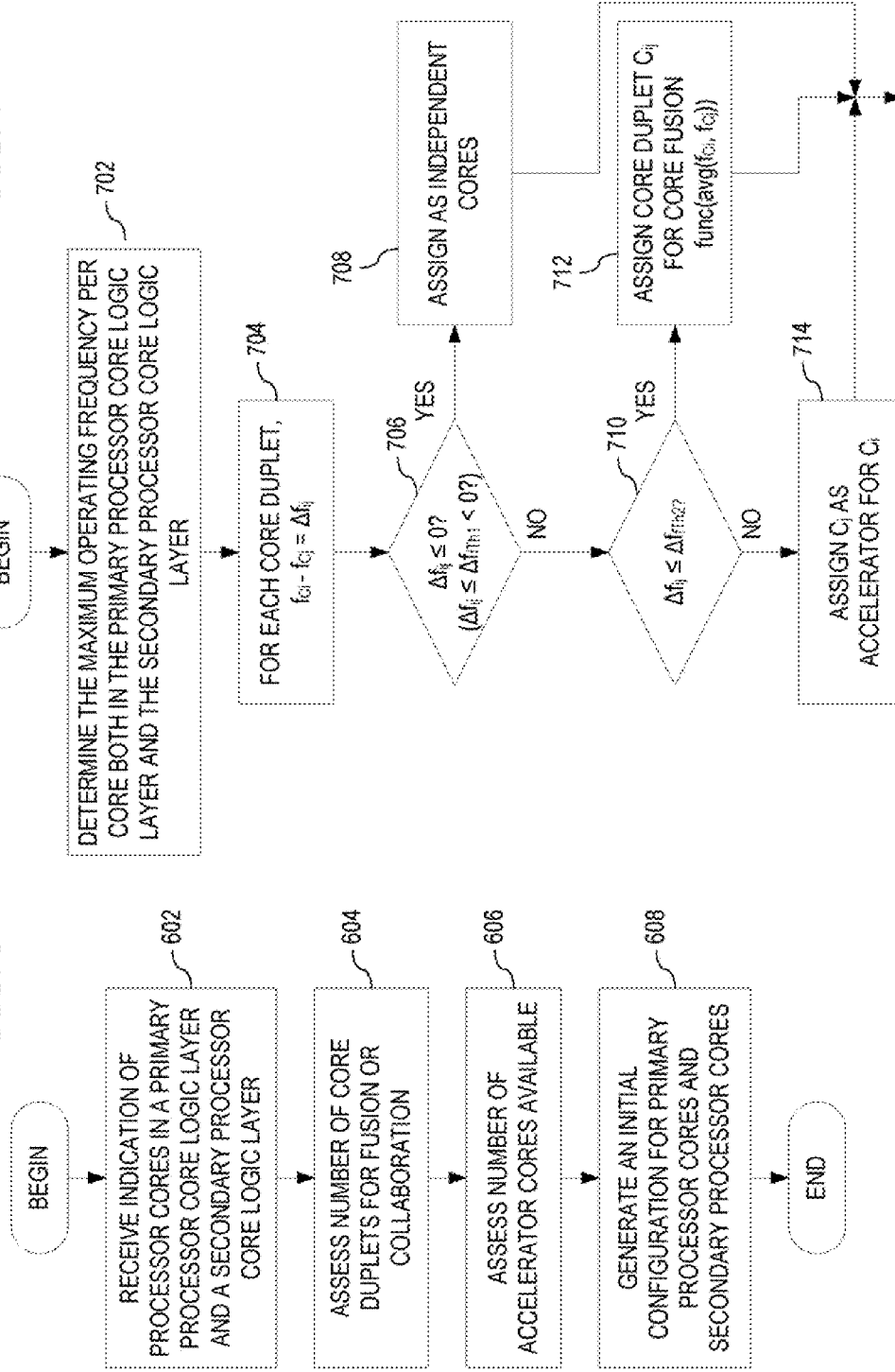

PROCESSOR CORE STACKING FOR EFFICIENT COLLABORATION

BACKGROUND

The present application relates generally to an improved data processing apparatus and method and more specifically to an apparatus and method for improving the performance and efficiency of multi-core processor architecture by enabling effective collaboration of processor cores.

Three-dimensional integration provides performance improvement for microprocessor architectures through the increased interconnectivity and higher packaging density. Through silicon via technology allows low latency and high bandwidth communication between the layers in a 3D stack. As the TSV scaling continues, splitting the computation onto multiple strata becomes possible at a finer grain (such as processor core, functional unit or macro level).

However, splitting logic onto multiple silicon layers presents various challenges such as:
  Thermal problems due to increased power density;
  Timing and functionality problems—as a result of process variability among different dies;
  Yield problems, since any faulty layer in the stack is likely to impact the functionality of the entire stack in fine-grain logic stacking.

SUMMARY

In one illustrative embodiment, a method, in a data processing system, is provided for improving the performance and efficiency of multi-core processors. The illustrative embodiment receives an indication of a set of primary processor cores in a primary processor core logic layer and a set of secondary processor cores in a secondary processor core logic layer. The illustrative embodiment determines an operational function for each primary processor core in the set of primary processor cores in the primary processor core logic layer and for each secondary processor core in the set of secondary processor cores in the secondary processor core logic layer, thereby forming a set of determined operational functions. The illustrative embodiment generates an initial configuration, based on the set of determined operational functions, for initializing the set of primary processor cores and the set of secondary processor cores in the three-dimensional processor core architecture. In the illustrative embodiment, the initial configuration indicates how at least one primary processor core of the set of primary processor cores collaborate with at least one secondary processor core of the set of secondary processor cores In other illustrative embodiments, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

In yet another illustrative embodiment, a computer program product comprising a computer useable or readable medium having a computer readable program is provided. The computer readable program, when executed on a computing device, causes the computing device to perform various ones, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 6 depicts an exemplary flowchart of the operation performed by the system controller in a three-dimensional processor core architecture in accordance with an illustrative embodiment; and FIG. 7 depicts an exemplary flowchart of the operation performed by the system controller in assessing the number of core duplets for fusion and collaboration in accordance with an illustrative embodiment.

DETAILED DESCRIPTION

The illustrative embodiments provide a mechanism for three-dimensional processor core architecture that provides performance improvement through an increased interconnectivity and higher packaging density. The three-dimensional processor core architecture is aided by through silicon via (TSV) technology that provides low-latency and high-bandwidth communication between layers of processor cores in the three-dimensional processor core architecture. A through-silicon via (TSV) is a vertical electrical connection passing completely through a silicon wafer or die. The use of TSVs provides for splitting computation performed by the processor cores onto multiple strata; thus, improving the performance and efficiency of three-dimensional processor core architecture by enabling effective collaboration of processor cores.

Figure 1:
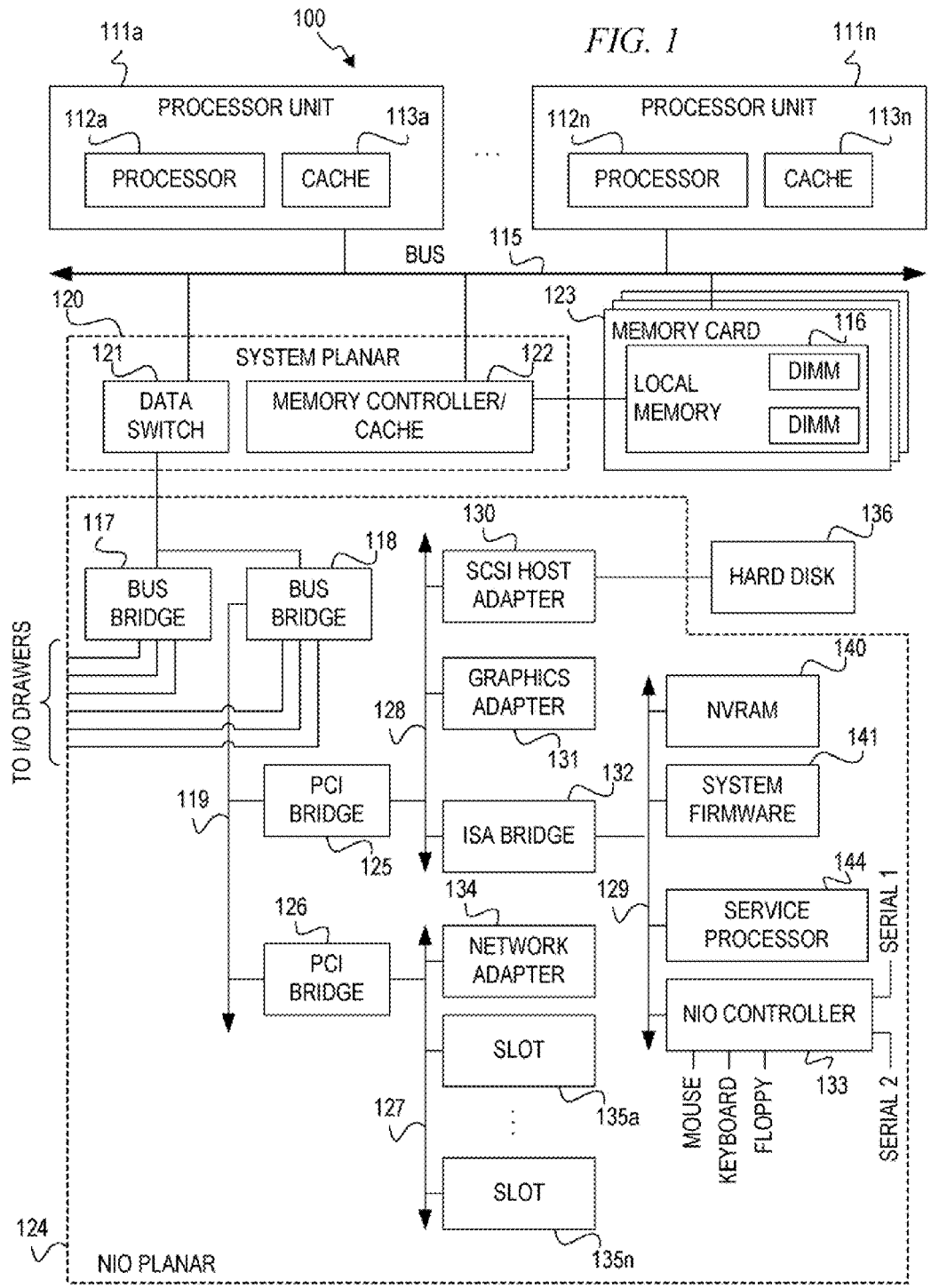
FIG. 1 depicts a block diagram of a data processing system with which aspects of the illustrative embodiments may advantageously be utilized.
Figure 2:
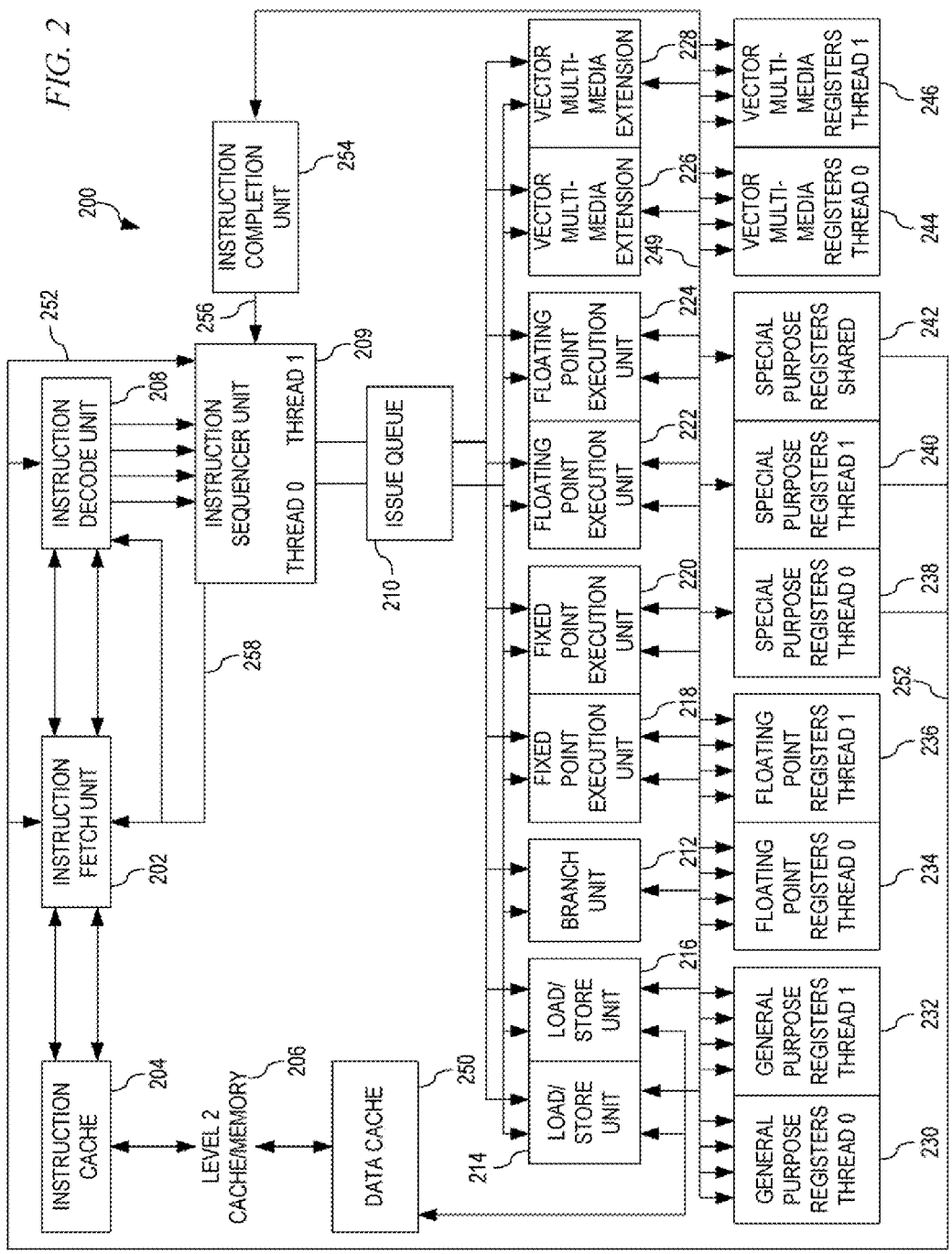
FIG. 2 depicts an exemplary block diagram of a conventional dual threaded processor design showing functional units and registers in accordance with an illustrative embodiment.

Thus, the illustrative embodiments may be utilized in many different types of data processing environments including a distributed data processing environment, a single data processing device, or the like. In order to provide a context for the description of the specific elements and functionality of the illustrative embodiments, FIGS. 1 and 2 are provided hereafter as example environments in which aspects of the illustrative embodiments may be implemented. While the description following FIGS. 1 and 2 will focus primarily on a single data processing device implementation for a three-dimensional processor core architecture that provides performance improvement through an increased interconnectivity and higher packaging density, this is only an example and is not intended to state or imply any limitation with regard to the features of the present invention. To the contrary, the illustrative embodiments are intended to include distributed data processing environments and embodiments in which performance improvement through an increased interconnectivity and higher packaging density may be provided for a three-dimensional processor core architecture.

Referring now to the drawings and in particular to FIG. 1, there is depicted a block diagram of a data processing system with which aspects of the illustrative embodiments may advantageously be utilized. As shown, data processing system 100 includes processor units 111a-111n. Each of processor units 111a-111n includes a processor and a cache memory. For example, processor card 111a contains processor 112a and cache memory 113a, and processor card 111n contains processor 112n and cache memory 113n.

Processor units 111a-111n are connected to main bus 115. Main bus 115 supports a system planar 120 that contains processor units 111a-111n and memory cards 123. The system planar also contains data switch 121 and memory controller/cache 122. Memory controller/cache 122 supports memory cards 123 that include local memory 116 having multiple dual in-line memory modules (DIMMs).

Data switch 121 connects to bus bridge 117 and bus bridge 118 located within a native I/O (NIO) planar 124. As shown, bus bridge 118 connects to peripheral components interconnect (PCI) bridges 125 and 126 via system bus 119. PCI bridge 125 connects to a variety of I/O devices via PCI bus 128. As shown, hard disk 136 may be connected to PCI bus 128 via small computer system interface (SCSI) host adapter 130. A graphics adapter 131 may be directly or indirectly connected to PCI bus 128. PCI bridge 126 provides connections for external data streams through network adapter 134 and adapter card slots 135a-135n via PCI bus 127.

An industry standard architecture (ISA) bus 129 connects to PCI bus 128 via ISA bridge 132. ISA bridge 132 provides interconnection capabilities through NIO controller 133 having serial connections Serial 1 and Serial 2. A floppy drive connection, keyboard connection, and mouse connection are provided by NIO controller 133 to allow data processing system 100 to accept data input from a user via a corresponding input device. In addition, non-volatile RAM (NVRAM) 140, connected to ISA bus 129, provides a non-volatile memory for preserving certain types of data from system disruptions or system failures, such as power supply problems. A system firmware 141 is also connected to ISA bus 129 for implementing the initial Basic Input/Output System (BIOS) functions. A service processor 144 connects to ISA bus 129 to provide functionality for system diagnostics or system servicing.

The operating system (OS) is stored on hard disk 136, which may also provide storage for additional application software for execution by data processing system. NVRAM 140 is used to store system variables and error information for field replaceable unit (FRU) isolation. During system startup, the bootstrap program loads the operating system and initiates execution of the operating system. To load the operating system, the bootstrap program first locates an operating system kernel type from hard disk 136, loads the OS into memory, and jumps to an initial address provided by the operating system kernel. Typically, the operating system is loaded into random-access memory (RAM) within the data processing system. Once loaded and initialized, the operating system controls the execution of programs and may provide services such as resource allocation, scheduling, input/output control, and data management.

The illustrative embodiment may be embodied in a variety of data processing systems utilizing a number of different hardware configurations and software such as bootstrap programs and operating systems. The data processing system 100 may be, for example, a stand-alone system or part of a network such as a local-area network (LAN) or a wide-area network (WAN).

Referring to FIG. 2, an exemplary block diagram of a conventional dual threaded processor design showing functional units and registers is depicted in accordance with an illustrative embodiment. Processor 200 may be implemented as processing unit 104 in FIG. 1 in these illustrative examples. Processor 200 comprises a single integrated circuit superscalar microprocessor with dual-thread simultaneous multi-threading (SMT) that may also be operated in a single threaded mode. Accordingly, as discussed further herein below, processor 200 includes various units, registers, buffers, memories, and other sections, all of which are formed by integrated circuitry. Also, in an illustrative embodiment, processor 200 operates according to reduced instruction set computer (RISC) techniques.

As shown in FIG. 2, instruction fetch unit (IFU) 202 connects to instruction cache 204. Instruction cache 204 holds instructions for multiple programs (threads) to be executed. Instruction cache 204 also has an interface to level 2 (L2) cache/memory 206. IFU 202 requests instructions from instruction cache 204 according to an instruction address, and passes instructions to instruction decode unit 208. In an illustrative embodiment, IFU 202 may request multiple instructions from instruction cache 204 for up to two threads at the same time. Instruction decode unit 208 decodes multiple instructions for up to two threads at the same time and passes decoded instructions to instruction sequencer unit (ISU) 209.

Processor 200 may also include issue queue 210, which receives decoded instructions from ISU 209. Instructions are stored in the issue queue 210 while awaiting dispatch to the appropriate execution units. For an out-of order processor to operate in an in-order manner, ISU 209 may selectively issue instructions quickly using false dependencies between each instruction. If the instruction does not produce data, such as in a read after write dependency, ISU 209 may add an additional source operand (also referred to as a consumer) per instruction to point to the previous target instruction (also referred to as a producer). Issue queue 210, when issuing the producer, may then wakeup the consumer for issue. By introducing false dependencies, a chain of dependent instructions may then be created, whereas the instructions may then be issued only in-order. ISU 209 uses the added consumer for instruction scheduling purposes and the instructions, when executed, do not actually use the data from the added dependency. Once ISU 209 selectively adds any required false dependencies, then issue queue 210 takes over and issues the instructions in order for each thread, and outputs or issues instructions for each thread to execution units 212, 214, 216, 218, 220, 222, 224, 226, and 228 of the processor. This process will be described in more detail in the following description.

In an illustrative embodiment, the execution units of the processor may include branch unit 212, load/store units (LSUA) 214 and (LSUB) 216, fixed point execution units (FXUA) 218 and (FXUB) 220, floating point execution units (FPUA) 222 and (FPUB) 224, and vector multimedia extension units (VMXA) 226 and (VMXB) 228. Execution units 212, 214, 216, 218, 220, 222, 224, 226, and 228 are fully shared across both threads, meaning that execution units 212, 214, 216, 218, 220, 222, 224, 226, and 228 may receive instructions from either or both threads. The processor includes multiple register sets 230, 232, 234, 236, 238, 240, 242, 244, and 246, which may also be referred to as architected register files (ARFs).

An ARF is a file where completed data is stored once an instruction has completed execution. ARFs 230, 232, 234, 236, 238, 240, 242, 244, and 246 may store data separately for each of the two threads and by the type of instruction, namely general purpose registers (GPRs) 230 and 232, floating point registers (FPRs) 234 and 236, special purpose registers (SPRs) 238 and 240, and vector registers (VRs) 244 and 246. Separately storing completed data by type and by thread assists in reducing processor contention while processing instructions.

The processor additionally includes a set of shared special purpose registers (SPR) 242 for holding program states, such as an instruction pointer, stack pointer, or processor status word, which may be used on instructions from either or both threads. Execution units 212, 214, 216, 218, 220, 222, 224, 226, and 228 are connected to ARFs 230, 232, 234, 236, 238, 240, 242, 244, and 246 through simplified internal bus structure 249.

In order to execute a floating point instruction, FPUA 222 and FPUB 224 retrieves register source operand information, which is input data required to execute an instruction, from FPRs 234 and 236, if the instruction data required to execute the instruction is complete or if the data has passed the point of flushing in the pipeline. Complete data is data that has been generated by an execution unit once an instruction has completed execution and is stored in an ARF, such as ARFs 230, 232, 234, 236, 238, 240, 242, 244, and 246. Incomplete data is data that has been generated during instruction execution where the instruction has not completed execution. FPUA 222 and FPUB 224 input their data according to which thread each executing instruction belongs to. For example, FPUA 222 inputs completed data to FPR 234 and FPUB 224 inputs completed data to FPR 236, because FPUA 222, FPUB 224, and FPRs 234 and 236 are thread specific.

During execution of an instruction, FPUA 222 and FPUB 224 output their destination register operand data, or instruction data generated during execution of the instruction, to FPRs 234 and 236 when the instruction has passed the point of flushing in the pipeline. During execution of an instruction, FXUA 218, FXUB 220, LSUA 214, and LSUB 216 output their destination register operand data, or instruction data generated during execution of the instruction, to GPRs 230 and 232 when the instruction has passed the point of flushing in the pipeline. During execution of a subset of instructions, FXUA 218, FXUB 220, and branch unit 212 output their destination register operand data to SPRs 238, 240, and 242 when the instruction has passed the point of flushing in the pipeline. Program states, such as an instruction pointer, stack pointer, or processor status word, stored in SPRs 238 and 240 indicate thread priority 252 to ISU 209. During execution of an instruction, VMXA 226 and VMXB 228 output their destination register operand data to VRs 244 and 246 when the instruction has passed the point of flushing in the pipeline.

Data cache 250 may also have associated with it a non-cacheable unit (not shown) which accepts data from the processor and writes it directly to level 2 cache/memory 206. In this way, the non-cacheable unit bypasses the coherency protocols required for storage to cache.

In response to the instructions input from instruction cache 204 and decoded by instruction decode unit 208, ISU 209 selectively dispatches the instructions to issue queue 210 and then onto execution units 212, 214, 216, 218, 220, 222, 224, 226, and 228 with regard to instruction type and thread. In turn, execution units 212, 214, 216, 218, 220, 222, 224, 226, and 228 execute one or more instructions of a particular class or type of instructions. For example, FXUA 218 and FXUB 220 execute fixed point mathematical operations on register source operands, such as addition, subtraction, ANDing, ORing and XORing. FPUA 222 and FPUB 224 execute floating point mathematical operations on register source operands, such as floating point multiplication and division. LSUA 214 and LSUB 216 execute load and store instructions, which move operand data between data cache 250 and ARFs 230, 232, 234, and 236. VMXA 226 and VMXB 228 execute single instruction operations that include multiple data. Branch unit 212 executes branch instructions which conditionally alter the flow of execution through a program by modifying the instruction address used by IFU 202 to request instructions from instruction cache 204.

Instruction completion unit 254 monitors internal bus structure 249 to determine when instructions executing in execution units 212, 214, 216, 218, 220, 222, 224, 226, and 228 are finished writing their operand results to ARFs 230, 232, 234, 236, 238, 240, 242, 244, and 246. Instructions executed by branch unit 212, FXUA 218, FXUB 220, LSUA 214, and LSUB 216 require the same number of cycles to execute, while instructions executed by FPUA 222, FPUB 224, VMXA 226, and VMXB 228 require a variable, and a larger number of cycles to execute. Therefore, instructions that are grouped together and start executing at the same time do not necessarily finish executing at the same time. "Completion" of an instruction means that the instruction is finishing executing in one of execution units 212, 214, 216, 218, 220, 222, 224, 226, or 228, has passed the point of flushing, and all older instructions have already been updated in the architected state, since instructions have to be completed in order. Hence, the instruction is now ready to complete and update the architected state, which means updating the final state of the data as the instruction has been completed. The architected state can only be updated in order, that is, instructions have to be completed in order and the completed data has to be updated as each instruction completes.

Instruction completion unit 254 monitors for the completion of instructions, and sends control information 256 to ISU 209 to notify ISU 209 that more groups of instructions can be dispatched to execution units 212, 214, 216, 218, 220, 222, 224, 226, and 228. ISU 209 sends dispatch signal 258, which serves as a throttle to bring more instructions down the pipeline to the dispatch unit, to IFU 202 and instruction decode unit 208 to indicate that it is ready to receive more decoded instructions. While processor 200 provides one detailed description of a single integrated circuit superscalar microprocessor with dual-thread simultaneous multi-threading (SMT) that may also be operated in a single threaded mode, the illustrative embodiments are not limited to such microprocessors. That is, the illustrative embodiments may be implemented in any type of processor using a pipeline technology.

The illustrative embodiments provide for a three-dimensional processor core architecture. In the three-dimensional processor core architecture processing cores are placed on more than one layer of silicon and are vertically stacked in order to improve the overall performance of the data processing system. The three-dimensional processor core architecture provides performance improvement over single layer architecture by enabling effective resource allocation dynamically at run time, such as assigning one or more functional units of a secondary processor core to a primary processor core. While logic stacking of processor cores creates serious heating problems due to the higher power density and increased thermal resistances from the heat source to the cooling solution, the illustrative embodiments minimize the power dissipation of the secondary processor core layer by assigning computationally intensive tasks to the primary processor core layer, whereas the secondary processor core layer is utilized as a performance enhancer. This division of assignment minimizes the power dissipation on the secondary processor core layer, thereby improving the resulting thermal profile.

The illustrative embodiments may be utilized for effective implementation of helper or assist threads due to a low-latency and high-bandwidth interconnect between the primary processor cores and the secondary processor cores. While the primary processor core is holding an architectural state, a helper or future thread may be spawned off the primary processor core to a secondary processor core. This helper thread may resolve branches, prefetch data, calculate values, or the like that may be used by the primary processor core. Helper threads may potentially be limited by whether or not the results are provided in time to help the main thread. Thus, the illustrative embodiments assigning helper threads to a dedicated secondary processor core with immediate vertical interconnectivity to the memory stack as well as minimal latency interconnect to the primary processor core.

The illustrative embodiments use the term "Core Fusion" as the act of combining the parts (or a subset of the parts) of more than one core to make an augmented core. In an ultimate practice of core fusion, two (or more) entire cores are conjoined to make a single "super" wider core. For example, two cores—each of which can decode two instructions per cycle—may be conjoined into a single core that may decode four instructions per cycle. In a less extreme form of core fusion, one core may augment itself by using parts from another core. For example, two cores, each with a single execution element, may instead be configured as a single core that has two execution elements, with all other parts of the second core not being used. Alternatively, the two cores may be configured as one augmented core and one depleted core, where the degree of augmentation and depletion may be varied dynamically. In a mildest form, core fusion may simply mean salvaging working components from one partially working core to replace nonworking components from another partially working core to make a single good core. In a further reliability mode of operation, if both processor cores (or parts of the processor cores) are working, the processor cores or parts of processor cores may be run together so as to check each other.

Figure 3:
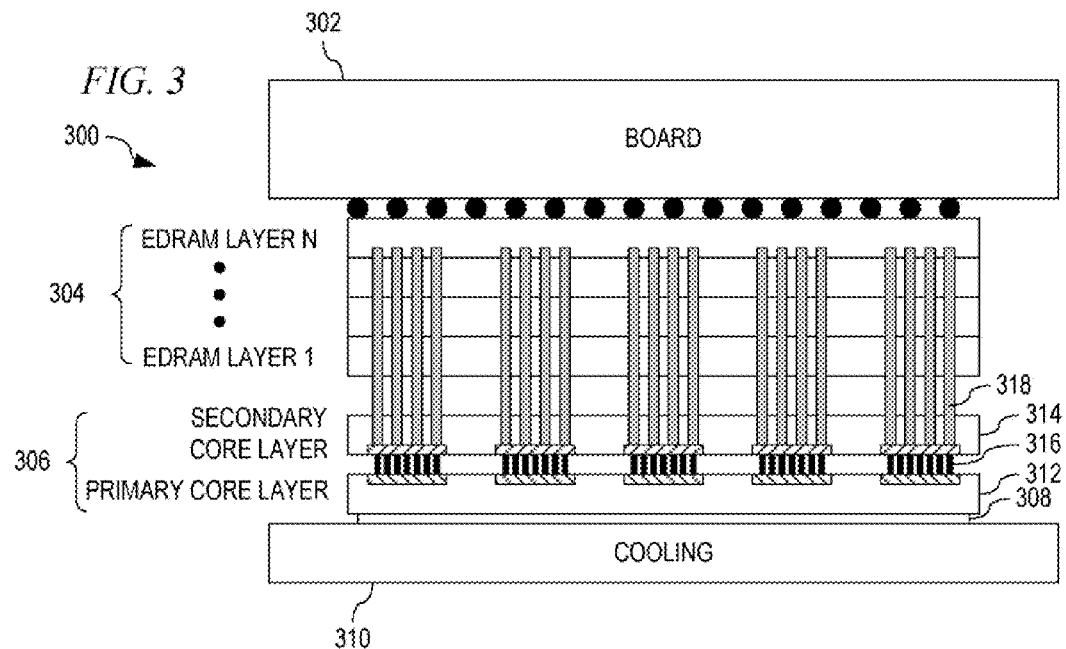
FIG. 3 depicts one example of a three-dimensional processor core architecture in accordance with an illustrative embodiment.

FIG. 3 depicts one example of a three-dimensional processor core architecture in accordance with an illustrative embodiment. In three-dimensional processor core architecture 300, individual silicon layers formed on board 302 are dedicated memory hierarchy layers 304, which may be in the form of dynamic random access memory (DRAM), embedded dynamic random access memory (SDRAM), or the like, logic 306 in the form of layers of processors, processing cores, or the like, thermal interface material (TIM) layer 308, and cooling device 310. Primary processor core logic layer 312 and secondary processor core logic layer 314 are manufactured in a face-to-face three-dimensional processor core architecture, where a distance between a primary processor core and a secondary processor core may be limited to a thickness of the Back-End-Of-The-Line (BEOL), which may be less than 10 µm, and the signals may be transmitted from the primary processor core to the secondary processor core without requiring any through silicon via (TSV). BEOL is the portion of integrated circuit fabrication where the active components, such as transistors, resistors, or the like, are interconnected with wiring in the silicon layers. Hence, low-latency high-bandwidth interconnect 316 between primary processor core logic layer 312 and secondary processor core logic layer 314 may be less than one clock cycle. That is, low-latency high-bandwidth interconnect 316 is formed such that low-latency high-bandwidth interconnect 316 is short, for example 10 µm, which provides a communications path that is smaller than a clock cycle. The nature of a face-to-face three-dimensional processor core architecture may also guarantee a higher bandwidth between collaborating logic layers as no through silicon via connection is needed. Memory hierarchy layers 304 are connected to secondary processor core logic layer 314 using TSVs 318.

Figure 4:
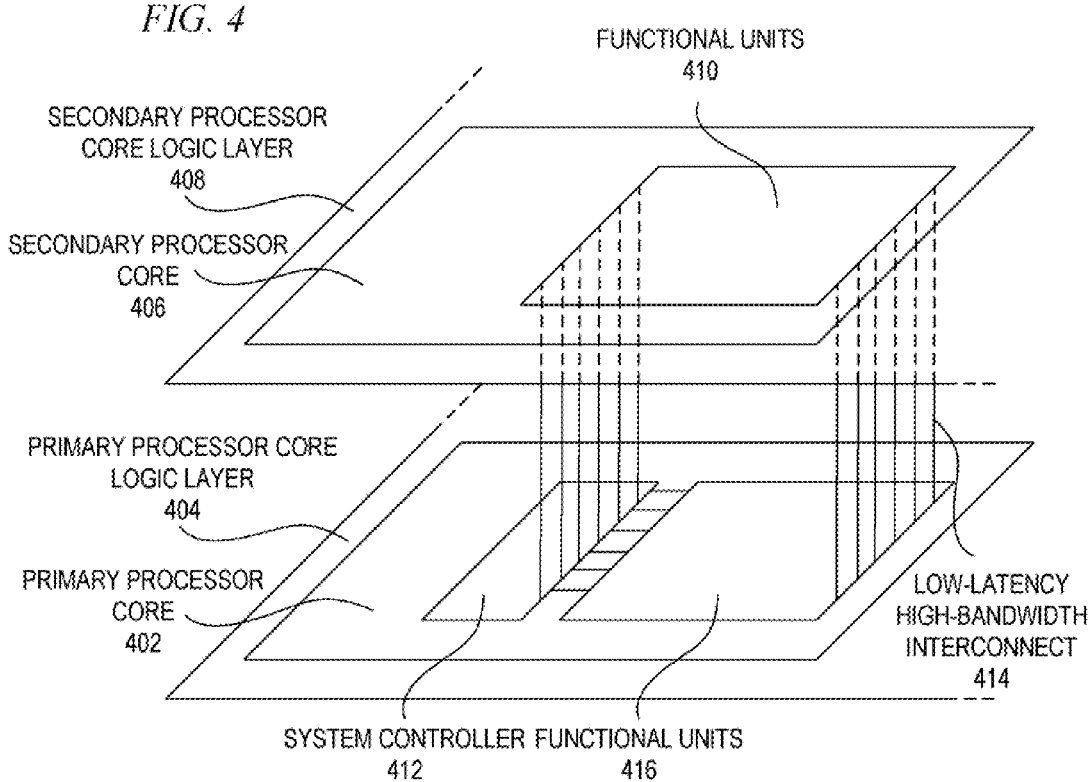
FIG. 4 depicts one example of collaborating processor cores in a three-dimensional processor core architecture in accordance with an illustrative embodiment.

FIG. 4 depicts one example of collaborating processor cores in a three-dimensional processor core architecture in accordance with an illustrative embodiment. As is shown, primary processor core 402 in primary processor core logic layer 404 immediately neighbors secondary processor core 406 in secondary processor core logic layer 408 vertically. Primary processor core 402 and secondary processor core 406 are aligned so that the inter-layer latencies provided by low-latency high-bandwidth interconnects 414 are less than a clock cycle. Primary processor core 402 comprises functional units 416 and secondary processor core 406 comprises functional units 410. Dynamic resource sharing is provided between collaborating primary processor core 402 and secondary processor core 406 where additional functional units 410 from secondary processor core 406 may be assigned to primary processor core 402 depending on workload behavior. Functional units 410 and 416 may be units, such as fixed point execution unit, floating point execution unit, branch unit, load/store unit, or the like. The configurable resource assignment may be enabled by system controller 412 located on primary processor core logic layer 404 and low-latency high-bandwidth interconnects 414.

Figure 5:
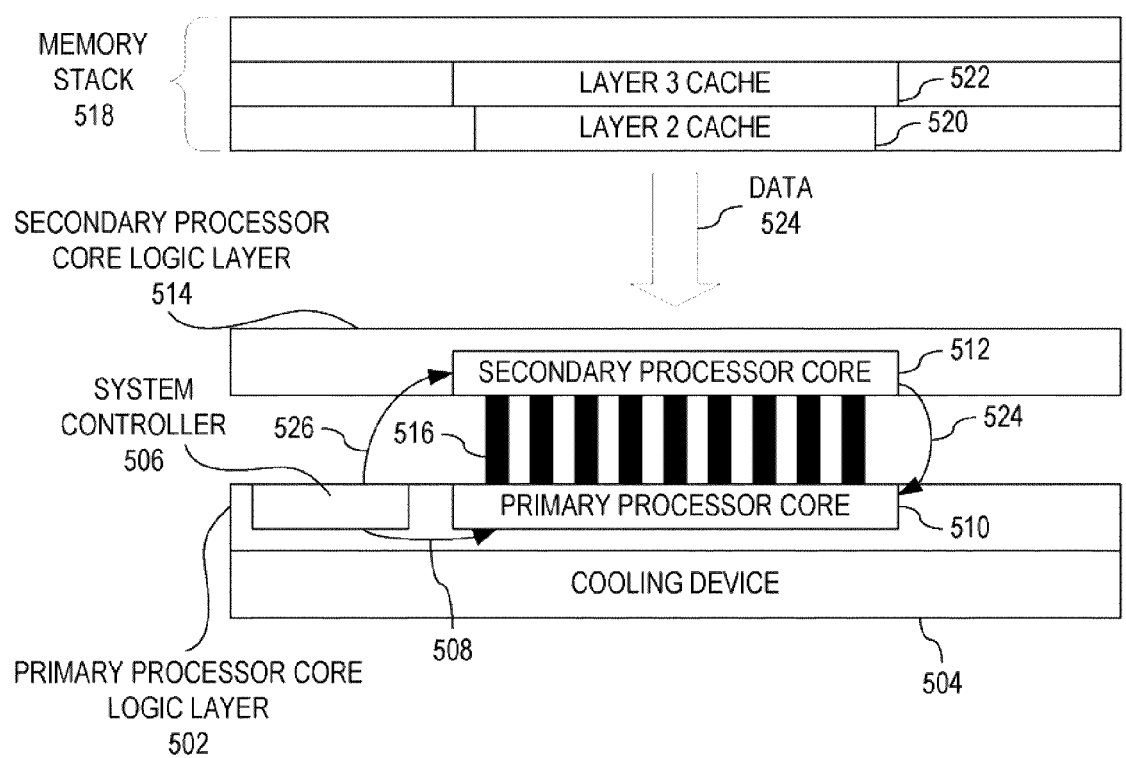
FIG. 5 depicts a more detailed example of collaborating cores in a three-dimensional processor core architecture in accordance with an illustrative embodiment.

FIG. 5 depicts a more detailed example of collaborating cores in a three-dimensional processor core architecture in accordance with an illustrative embodiment. In this example, primary processor core logic layer 502 is closer in proximity to cooling device 504, such as a heat sink or the like, and, as a result, system controller 506 assigns higher performance threads and/or applications 508 to primary processor core 510, where secondary processor core 512 on secondary processor core logic layer 514 may be used to boost the performance of the primary processor core 510 using low-latency high-bandwidth interconnects 516. Secondary processor core logic layer 514 is closer to memory stack 518, which may comprise layer 2 (L2) memory 520 and layer 3 (L3) memory 522. Therefore, secondary processor core logic layer 514 may be utilized to prefetch data 524 from memory stack 518. Data 524 is then provided to primary processor core 510 as needed via low-latency high-bandwidth interconnects 516.

Collaborating processor cores 510 and 512 share a single cache hierarchy that is located in the immediately vertical layers of memory stack 518. Through silicon vias (TSVs) provide the interconnectivity among memory stack 518. A through-silicon via (TSV) is a vertical electrical connection passing completely through a silicon wafer or die. The top layers of memory stack 518 may be allocated to shared memory layers. The memory structures in memory stack 518 may be optimized for the vertical nature of the processing. Thus, while primary processor core 510 is running high performance thread 508, one or more helper threads 526 may be spawned off to secondary processor core logic layer 514 to do look-ahead speculative execution. Since the processor core is altered to handle dynamic resource allocation, the processor core receives inputs from high performance thread 508 as well as helper threads 526. System controller 506 located in primary processor core logic layer 502 decides on the resource allocation details between primary processor core logic layer 502 and secondary processor core logic layer 514. As primary processor core logic layer 502 and secondary processor core logic layer 514 are connected with low-latency high-bandwidth interconnects 516 with less than 10 μm distances, hardware allocation and resource sharing may be achieved with little or no performance degradation. The three-dimensional processor core architecture may be capable of incorporating more helper thread context than traditional simultaneous multithreading (SMT) helper thread implementations, due to the nature of secondary processor core 406, because the processor cores in neighbor layers may provide additional parallel execution units which may help boost SMT potential. Furthermore, helper threads 526 may be more likely to provide data to main thread 508 in time, due to low-latency high-bandwidth interconnects 516 between primary processor core 510 and secondary processor core 512, reduced cache latency, and the additional hardware in secondary processor core 512.

System controller 506 determines how processor cores in a primary processor core logic layer and a secondary processor core logic layer will operate by assessing the number of core duplets for fusion and collaboration. System controller 506 determines how processor cores in a primary processor core logic layer and a secondary processor core logic layer will operate by assessing characteristics of the processor cores such as frequency, voltage, performance characteristics, or the like. The performance characteristics may be temperature, number of instructions processed over a given time period, or the like. While system controller 506 may use any number of characteristics to determine how processor cores in a primary processor core logic layer and a secondary processor core logic layer operate, the following description uses frequency as only one example, without departing from the spirit and scope of the invention.

System controller 506 initially determines the maximum clock frequency per core both in primary processor core logic layer 502 and secondary processor core logic layer 514. For each core duplet, i.e. vertically aligned primary processor core 510 ($C_i$) and secondary processor core 512 ($C_j$) system controller 506 determines a delta frequency ($\Delta f_{ij}$) by subtracting the operating frequency of secondary processor core 512 from the operating frequency of primary processor core 510, ($f_{Ci}-f_{Cj}=\Delta f_{ij}$). If $\Delta f_{ij}$ is less than or equal to zero or less than or equal to a predetermined first delta frequency threshold $\Delta f_{fTh1}$ that is less than zero, then system controller 506 assigns both primary processor core 510 and secondary processor core 512 as independently operating processor cores.

If $\Delta f_{ij}$ is greater than zero, then system controller 506 determines if $\Delta f_{ij}$ is less than or equal to a predetermined second delta frequency threshold $\Delta f_{fTh2}$. If $\Delta f_{ij}$ is less than or equal to $\Delta f_{fTh2}$, then system controller 506 marks the core duplet formed by primary processor core 510 and secondary processor core 512 as core fusion processor cores for core fusion with a functional frequency that is average of the operation frequencies of primary processor core 510 and secondary processor core 512 (func(avg($f_{Ci}, f_{Cj}$))). Again, core fusion is the act of combining the parts (or a subset of the parts) of more than one core to make an augmented core. If $\Delta f_{ij}$ is greater than $\Delta f_{fTh2}$, then system controller 506 assigns secondary processor core 512 ($C_j$) as an accelerator processor core for primary processor core 510 (CO. System controller 506 then assesses the number of accelerator processor cores available in secondary processor core logic layer 514 and provides an initial configuration for initializing primary processor cores and secondary processor cores in the three-dimensional processor core architecture.

As will be appreciated by one skilled in the art, the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electro-magnetic, infrared, or semiconductor system, apparatus, device, or any suitable combination of the foregoing. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

FIG. 6 depicts an exemplary flowchart of the operation performed by the system controller in a three-dimensional processor core architecture in accordance with an illustrative embodiment. As the operation begins, the system controller receives an indication of a number of primary processor cores in a primary processor core logic layer and a number of secondary processor cores in a secondary processor core logic layer (step 602). The system controller then determines an operation function for each of the primary processor cores in the primary processor core logic layer and the secondary processor cores in the secondary processor core logic layer by assessing the number of core duplets for fusion and collaboration (step 604). The operation performed in step 604 is further detailed in FIG. 7. The system controller then assesses the number of accelerator processor cores available in the secondary processor core logic layer (step 606). The system controller then generates an initial configuration for initializing the primary processor cores and the secondary processor cores in the three-dimensional processor core architecture (step 608), with the operation ending thereafter.

FIG. 7 depicts an exemplary flowchart of the operation performed by the system controller in assessing the number of core duplets for fusion and collaboration in accordance with an illustrative embodiment. As the operation begins, the system controller determines the maximum operating frequency per core both in the primary processor core logic layer and the secondary processor core logic layer (step 702). For each core duplet, i.e. vertically aligned primary processor core ($C_i$) and secondary processor core ($C_j$), the system controller determines a delta frequency ($\Delta f_{ij}$) by subtracting the operating frequency of the secondary processor core from the operating frequency of the primary processor core, ($f_{Ci} - f_{Cj} = \Delta f_{ij}$) (step 704). The system controller then determines if the delta frequency $\Delta_{ij}$ is less than or equal to zero or less than or equal to a predetermined first delta frequency threshold $\Delta f_{fTh1}$ that is less than zero (step 706).

If at step 706 the delta frequency $\Delta f_{ij}$ is less than or equal to zero or less than or equal to a predetermined first delta frequency threshold $\Delta_{fTh1}$ that is less than zero, then the system controller assigns both primary processor core and secondary processor core as independently operating processor cores (step 708), with the operation ending thereafter. If at step 706 the delta frequency $\Delta f_{ij}$ is greater than zero, then the system controller determines whether the delta frequency $\Delta f_{ij}$ is less than or equal to a predetermined second delta frequency threshold $\Delta f_{fTh2}$ (step 710). If the delta frequency $\Delta f_{ij}$ is less than or equal to the predetermined second delta frequency threshold $\Delta f_{fTh2}$, then the system controller assigns the core duplet formed by primary processor core and secondary processor core for core fusion with a functional frequency that is average of the maximum operation frequencies of primary processor core and secondary processor core, (func(avg($f_{Ci}$, $f_{Cj}$))) (step 712), with the operation ending thereafter. Again, core fusion is the act of combining the parts (or a subset of the parts) of more than one core to make an augmented core. If the delta frequency $\Delta f_{ij}$ is greater than the predetermined second delta frequency threshold $\Delta f_{fTh2}$, then the system controller assigns the secondary processor core ($C_j$) as an accelerator processor core for primary processor core ($C_i$) (step 714), with the operation ending thereafter.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the illustrative embodiments provide mechanisms for a three-dimensional processor core architecture. In the three-dimensional processor core architecture processing cores are placed on more than one layer of silicon and are vertically stacked in order to improve the overall performance of the data processing system. The three-dimensional processor core architecture provides performance improvement over single layer architecture by enabling effective resource allocation dynamically at run time, such as assigning one or more functional units of a secondary processor core to a primary processor core.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for improving the performance and efficiency of multi-core processors, the method comprising:
    receiving, by a system controller in the data processing system, an indication of set of primary processor cores in a primary processor core logic layer and a set of secondary processor cores in a secondary processor core logic layer;
    determining, by the system controller, an operational function for each primary processor core in the set of primary processor cores in the primary processor core logic layer and for each secondary processor core in the set of secondary processor cores in the secondary processor core logic layer, thereby forming a set of determined operational functions; and
    generating, by the system controller, an initial configuration, based on the set of determined operational functions, for initializing the set of primary processor cores and the set of secondary processor cores in a three-dimensional processor core architecture, wherein the initial configuration indicates how at least one primary processor core of the set of primary processor cores collaborate with at least one secondary processor core of the set of secondary processor cores.

2. The method of claim 1, wherein the at least one primary processor core and the at least one secondary processor core uses the initial configuration for hardware allocation and resource sharing.

3. The method of claim 1, wherein the operational function for each processor core in the set of processor cores in the primary processor core layer is at least one of an independently operating processor core or a core fusion processor core and wherein the operational function for each processor core in the set of processor cores in the secondary processor core layer is at least one of an independently operating processor core, a core fusion processor core, or an accelerator processor core.

4. The method of claim 1, wherein determining the operational function for each primary processor core in the set of primary processor cores in the primary processor core logic layer and for each secondary processor core in the set of secondary processor cores in the secondary processor core logic layer farther comprises:
    assessing characteristics for each of the primary processor cores and for each of the secondary processor cores, wherein the characteristics comprise at least one of a frequency, a voltage, or a performance characteristic and wherein the performance characteristic comprises at least one of a temperature or a number of instructions processed over a given time period associated with each processor core.

5. The method of claim 1, wherein determining the operational function for each primary processor core in the set of primary processor cores in the primary processor core logic layer and fur each secondary processor core in the set of secondary processor cores in the secondary processor core logic layer further comprises:
    determining, by the system controller, a maximum operating frequency for each primary processor core in the set of primary processor cores in the primary processor core logic layer and for each secondary processor core in the set of secondary processor cores in the secondary processor core logic layer;
    for each vertically aligned primary processor core and secondary processor core, determining, by the system controller, a delta frequency by subtracting the maximum operating frequency of the secondary processor core from the maximum operating frequency of the primary processor core; and
    responsive to the delta frequency being less than or equal to zero or less than or equal to a predetermined first delta frequency threshold that is less than zero, assigning, by the system controller, both the primary processor core and the secondary processor core as independently operating processor cores.

6. The method of claim 5, further comprising:
    responsive to the delta frequency being greater than zero, determining, by the system controller, whether the delta frequency is less than or equal to a predetermined second delta frequency threshold; and
    responsive to the delta frequency being less than or equal to the predetermined second delta frequency threshold, assigning, by the system controller, the vertically aligned primary processor core and secondary processor core for core fusion.

7. The method of claim 6, wherein the vertically aligned primary processor core and secondary processor core assigned for core fusion have a functional frequency that is average of the maximum operation frequencies of the primary processor core and the secondary processor core.

8. The method of claim 6, further comprising:
    responsive to the delta frequency being greater than the predetermined second delta frequency threshold, assigning, by the system controller, the secondary processor core as an accelerator processor core for the primary processor core.

9. An apparatus, comprising:
    a processor; and
    a memory coupled to the processor, wherein the memory comprises instructions which, when executed by the processor, cause the processor to
    receive an indication of a set of primary processor cores in a primary processor core logic layer and a set of secondary processor cores in a secondary processor core logic layer;
    determine an operational function for each primary processor core in the set of primary processor cores in the primary processor core logic layer and for each secondary processor core in the set of secondary processor cores in the secondary processor core logic layer, thereby forming a set of determined operational functions; and generate an initial configuration, based on the set of determined operational functions, for initializing the set of primary processor cores and the set of secondary processor cores in a three-dimensional processor core architecture, wherein the initial configuration indicates how at least one primary processor core of the set of primary processor cores collaborate with at least one secondary processor core of the set of secondary processor cores.

10. The apparatus of claim 9, wherein the at least one primary processor core and the at least one secondary processor core uses the initial configuration for hardware allocation and resource sharing.

11. The apparatus of claim 9, wherein the operational function for each processor core in the set of processor cores in the primary processor core layer is at least one of an independently operating processor core or a core fusion processor core and wherein the operational function for each processor core in the set of processor cores in the secondary processor core layer is at least one of an independently operating processor core, a core fusion processor core, or an accelerator processor core.

12. The apparatus of claim 9, wherein the instructions to determine the operational function for each primary processor core in the set of primary processor cores in the primary processor core logic layer and for each secondary processor core in the set of secondary processor cores in the secondary processor core logic layer further cause the processor to:

assess characteristics for each of the primary processor cores and for each of the secondary processor cores, wherein the characteristics comprise at least one of a frequency, a voltage, or a performance characteristic and wherein the performance characteristic comprises at least one of a temperature or a number of instructions processed over a given time period associated with each processor core.

13. The apparatus of claim 9, wherein the instructions to determine the operational function for each primary processor core in the set of primary processor cores in the primary processor core logic layer and for each secondary processor core in the set of secondary processor cores in the secondary processor core logic layer further cause the processor to:

determine a maximum operating frequency for each primary processor core in the set of primary processor cores in the primary processor core logic layer and for each secondary processor core in the set of secondary processor cores in the secondary processor core logic layer;

for each vertically aligned primary processor core and secondary processor core, determine a delta frequency by subtracting the maximum operating frequency of the secondary processor core from the maximum operating frequency of the primary processor core; and responsive to the delta frequency being less than or equal to zero or less than or equal to a predetermined first delta frequency threshold that is less than zero, assign both the primary processor core and the secondary processor core as independently operating processor cores.

14. The apparatus of claim 13, wherein the instructions further cause the processor to:

responsive to the delta frequency being greater than zero, determine whether the delta frequency is less than or equal to a predetermined second delta frequency threshold; and responsive to the delta frequency being less than or equal to the predetermined second delta frequency threshold, assign the vertically aligned primary processor core and secondary processor core for core fusion.

15. The apparatus of claim 14, wherein the vertically aligned primary processor core and secondary processor core assigned for core fusion have a functional frequency that is average of the maximum operation frequencies of the primary processor core and the secondary processor core.

16. The apparatus of claim 14, wherein the instructions further cause the processor to:

responsive to the delta frequency being greater than the predetermined second delta frequency threshold, assign the secondary processor core as an accelerator processor core for the primary processor core.

17. A computer program product comprising a non-transitory computer readable storage medium having a computer readable program stored therein, wherein the computer readable program, when executed on a computing device, causes the computing device to:

receive an indication of a set of primary processor cores in a primary processor core logic layer and a set of secondary processor cores in a secondary processor core logic layer;

determine an operational function for each primary processor core in the set of primary processor cores in the primary processor core logic layer and for each secondary processor core in the set of secondary processor cores in the secondary processor core logic layer, thereby forming a set of determined operational functions; and generate an initial configuration, based on the set of determined operational functions, for initializing the set of primary processor cores and the set of secondary processor cores in a three-dimensional processor core architecture, wherein the initial configuration indicates how at least one primary processor core of the set of primary processor cores collaborate with at least one secondary processor core of the set of secondary processor cores.

18. The computer program product of claim 17, wherein the at least one primary processor core and the at least one secondary processor core uses the initial configuration for hardware allocation and resource sharing, wherein the operational function for each processor core in the set of processor cores in the primary processor core layer is at least one of an independently operating processor core or a core fusion processor core and wherein the operational function for each processor core in the set of processor cores in the secondary processor core layer is at least one of an independently operating processor core, a core fusion processor core, or an accelerator processor core.

19. The computer program product of claim 17, wherein the computer readable program to determine the operational function for each primary processor core in the set of primary processor cores in the primary processor core logic layer and for each secondary processor core in the set of secondary processor cores in the secondary processor core logic layer further causes the computing device to:

determine a maximum operating frequency for each primary processor core in the set of primary processor cores in the primary processor core logic layer and for each secondary processor core in the set of secondary processor cores in the secondary processor core logic layer;

for each vertically aligned primary processor core and secondary processor core, determine a delta frequency by subtracting the maximum operating frequency of the secondary processor core from the maximum operating frequency of the primary processor core; and responsive to the delta frequency being less than or equal to zero or less than or equal to a predetermined first delta frequency threshold that is less than zero, assign both the primary processor core and the secondary processor core as independently operating processor cores.

20. The computer program product of claim 19, wherein the computer readable program further causes the computing device to responsive to the delta frequency being greater than zero, determine whether the delta frequency is less than or equal to a predetermined second delta frequency threshold;

responsive to the delta frequency being less than or equal to the predetermined second delta frequency threshold, assign the vertically aligned primary processor core and secondary processor core for core fusion, wherein the vertically aligned primary processor core and secondary processor core assigned for core fusion have a functional frequency that is average of the maximum operation frequencies of primary processor core and secondary processor core; and responsive to the delta frequency being greater than the predetermined second delta frequency threshold, assign the secondary processor core as an accelerator processor core for the primary processor core.

* * * * *